United States Patent [19]

Bakul

[11] 4,397,182

[45] Aug. 9, 1983

[54] METHOD OF ALIGNING A WATER LEVEL INDICATOR HAVING A REMOTE AND A LOCAL READOUT DISPLAY

[75] Inventor: Dave Bakul, Lancaster, Ohio

[73] Assignee: The Babcock & Wilcox Company, New Orleans, La.

[21] Appl. No.: 249,307

[22] Filed: Mar. 31, 1981

[51] Int. Cl.³ .................... G01F 23/00; G01B 11/00
[52] U.S. Cl. ................................. 73/293; 356/399; 356/153
[58] Field of Search ............... 356/399, 153, 154; 73/293

[56] References Cited

U.S. PATENT DOCUMENTS

| | | | |
|---|---|---|---|
| 3,457,018 | 7/1969 | Kloss | 356/153 |
| 3,518,005 | 6/1970 | Weber | 356/399 X |
| 3,531,205 | 9/1970 | Nussmeier | 356/153 X |
| 3,574,467 | 4/1971 | Paine et al. | 356/153 |
| 3,713,338 | 1/1973 | Kind | 73/293 |
| 3,718,396 | 2/1973 | Hennings | 356/399 X |
| 3,752,587 | 7/1973 | Myers et al. | 356/154 X |
| 3,782,829 | 1/1974 | Herriott | 356/153 X |
| 3,813,169 | 5/1974 | Kaestner | 356/399 X |
| 3,870,416 | 4/1975 | Brady et al. | 356/399 X |
| 3,871,772 | 3/1975 | Munnedyn et al. | 356/399 X |
| 4,260,254 | 4/1981 | Braun | 356/153 X |
| 4,294,546 | 10/1981 | Killman et al. | 356/399 |

OTHER PUBLICATIONS

Optical Alignment Device for Lasers; by R. Anstis in Optics Technology, May 1970, vol. 2, No. 2, p. 102.
Reflectance Scanner With Direct Viewing During Alignment, by Harrison, IBM Technical Disclosure, Jul. 1981, vol. 24, No. 2, p. 1201.

*Primary Examiner*—Stephen A. Kreitman
*Assistant Examiner*—David V. Carlson
*Attorney, Agent, or Firm*—Vytas R. Matas; Robert J. Edwards

[57] ABSTRACT

A water level indicating apparatus (10) has an optical system (22) for establishing an optical signal indicative of water level which signal is split by a beam splitter (18) to transmit the majority of the optical signal to a fiber optic cable (16) and to reflect a part of the signal to a proximately located (13) glass diffuser (14). The end 24 of the cable (16) is reflected in the beam splitter (18) to form a reflection (24') which varies in intensity as the end (24) of the cable (16) is moved with the brightest reflection (24') appearing when the lamp(26) of the optical system (22) is in line with the end (24) of the cable (16).

4 Claims, 2 Drawing Figures

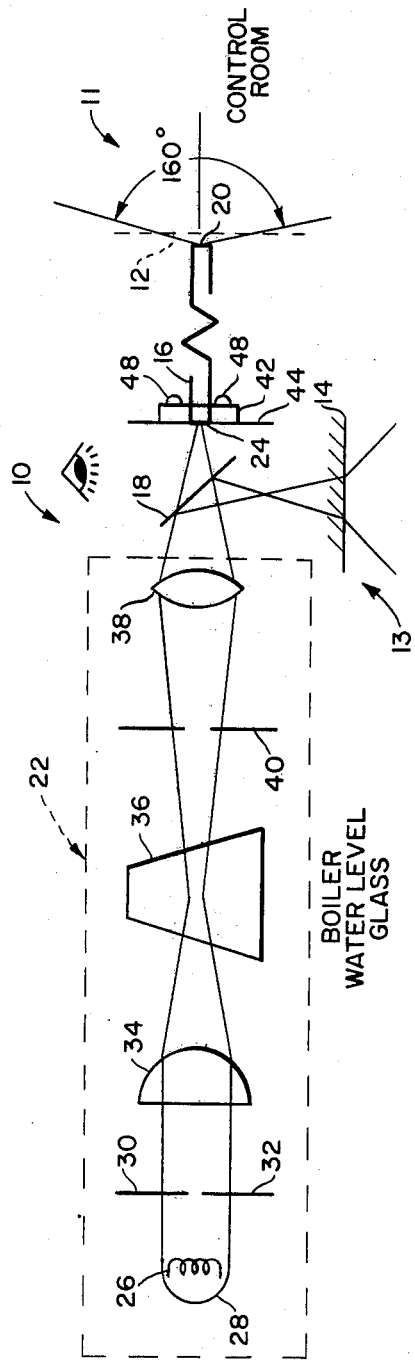
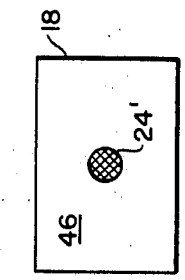
FIG. 1.
FIG. 2.

METHOD OF ALIGNING A WATER LEVEL INDICATOR HAVING A REMOTE AND A LOCAL READOUT DISPLAY

TECHNICAL FIELD

The present invention relates to water level indicators generally and in particular to a method of aligning a water level indicator for boilers which have a remote and a local readout display of the boiler water level.

BACKGROUND ART

Water level indicators having a remote fiber optic readout display are well-known. An example of such a device may be seen in U.S. Pat. No. 3,713,338. In such devices the water level optical signal is focused on one end of a fiber optic assembly and is transmitted along a significant length of the fiber optic assembly to a remote readout area where the other end of the fiber optic assembly terminates.

In certain situations a local readout of the water level signal is desired in addition to the remote readout display. For such situations a beam splitter is used for the optical signal indicative of water level with the beam splitter transmitting the majority of the optical signal to a single fiber optic assembly of extended length which provides the remote readout of the water level signal. A small portion of the optical signal is reflected by the beam splitter directly to a glass diffuser screen which screen provides the local readout of the optical signal indicative of water level. The optical signal indicative of water level is focused directly on the end of the single remote readout fiber optic assembly. This significantly increases the available light provided to the remote readout fiber optic assembly and thus compensates for the losses suffered by the signal going through the extended length of the fiber optic assembly.

In such units it is very desirable to align the remote fiber optic cable with the axis of the illuminator to provide a maximum of illumination to the fiber optic cable. Such alignment could be done by actual measurements of the distances between the illuminator and the fiber optic cable with reference to some standard reference point or points. However, this is time-consuming and inaccurate.

SUMMARY OF THE INVENTION

The problems associated with the prior art alignment methods as well as others were solved by the method of the present invention which aligns the illuminator and the remote fiber optic cable by viewing a reflection of the fiber optic cable on a beamsplitter located between the illuminator and the fiber optic cable. The reflection of the end of the fiber optic cable is seen on the beam splitter face facing the fiber optic cable and varies in intensity of illumination as the end of the cable is moved around. The highest intensity signal is determined and the fiber optic cable is then secured to this position thus aligning it with the illuminator.

In view of the foregoing, it will be seen that one aspect of the present invention is to provide a method of aligning a water level indicator assembly having a beam splitter by a viewed reflection on the beam splitter.

Another aspect of the present invention is to provide a method of aligning a water level indicator assembly through a reflected image of a fiber optic cable.

These and other aspects of the present invention will be more clearly understood upon a review of the description of the preferred embodiment when considered with the accompanying drawings.

BRIEF DESCRIPTION OF THE DRAWINGS

FIG. 1 is a schematic of the water level indicator assembly of the present invention.

FIG. 2 is an expanded top view of the face of the beam splitter of FIG. 1.

DESCRIPTION OF THE PREFERRED EMBODIMENT

Referring now to the drawings wherein the showings are for purposes of describing a preferred embodiment of the present invention and are not intended to limit the invention thereto, an indicator assembly 10 is shown for use in a boiler drum water level indicating assembly. The water level indicator assembly 10 details one port of what is usually a five-port type water level indicator assembly for a boiler drum. Since all five ports of such indicator assemblies are identical, a single port is detailed herein and it will be understood that any number of such ports may be used.

The water level indicator assembly 10 has a remote readout display 11 in the form of a matte screen 12, located in the control room of the power plant from which remote location the actual power plant boiler is controlled. A local readout display 13 is provided by a glass diffuser 14 located proximate to the boiler drum. The glass diffuser 14, rather than the matte screen 12, is used at the boiler drum where a hot dirty environment exists. The glass diffuser 14 spreads the light efficiently over an approximate 90° angle which is sufficient for viewing the level near the boiler drum. Larger angle dispersing elements would not hold up for long time periods in the boiler drum environment where temperatures exceed 200° F.

The matte screen 12 of the remote readout display 11 is mounted at the end of a fiber optic cable 16 and is used to increase the output angle of the fiber optic assembly 16 from its normal 26° output angle to 160° along the horizontal axis and 50° along the vertical axis. The 26° field of view of the bare fiber optic cable 16 is insufficient to provide observation of the remote display 11 by a control room operator from many positions in the control room, especially at the panel usually mounted directly below the remote display 11 where boiler feedwater controls are located and where the operator frequently stands. The matte screen 12 is made to have a scattering particle size of 12 $\mu$m. These small particles scatter light efficiently into large angles. Thus, the matte screen 12 is able to increase the viewing area for the operator looking at the matte screen 12 instead of the bare cable. With this increase in viewing angle, the operator at the feedwater control panel can now see the remote display 11.

The fiber optic cable 16 is used to send the water level indication signal from a beam splitter 18 located proximately to the boiler drum to the matte screen 12 which is located in the control room of the power plant. As such, the fiber optic cable 16 usually extends for approximately 250 to 500 feet. This extended length of fiber optic cable produces approximately a 40 percent loss of input signal at the exit end 20 of the fiber optic cable 16. The fiber optic cable 16 is thus seen to have a relatively low loss characteristic of approximately 50 db/km as compared to low cost fiber cables which have losses in excess of 500 db/km. The fiber optic cable 16 also has a fiber diameter of 0.6 millimeters which makes the cable 16 relatively flexible while still being a relatively low loss cable.

The optical assembly 22 shown to the left of the signal input end 24 of the fiber optic cable 16 is constructed to achieve maximum power coupling of the water level optical signal to the input end 24 of the cable 16 as well as to provide a highly visible local readout signal at the glass diffuser 14. The optical system 22 consists of a tungsten filament lamp 26 having a built-in reflector 28 that projects a light beam through a side-by-side red filter 30 and a green filter 32. Spaced from the filters 30 and 32 is a low F number lens 34 which focuses an image of the tungsten lamp 26 between a water level gage 36 mounted to the boiler drum in a known manner and a coupling lens 38. Located between the water level gage 36 and the coupling lens 38 is an aperture plate 40 aligned so that either a red or a green beam passes therethrough.

The requirements of the optical system 22 are first to focus onto the front face 24 of the cable 16 an image of the filament image produced by the lens 34, second that the cone of light converging from the coupling lens 38 must be at least as large as the acceptance angle defined by the fiber of the cable 16, and thirdly, that the size of the source image must be at least as large as the fiber of the cable 16. Since both the focal length of the lens 38 as well as the separation between the lens 38 and filament image plane can be chosen there are a number of possible lens 38 choices that will satisfy the recited conditions.

In operation, the light transmitted through the water level gage 36 by the tungsten lamp 26 by virtue of the lens 34 is collected by the focusing lens 38 and is focused through the beam splitter 18 onto the polished input end 24 of the fiber optic cable 16. The beam splitter transmits approximately 85 percent of the light from the focusing lens 38 onto the input end 24 of the cable 16. Approximately 15 percent of the light from the focusing lens 38 is reflected 90° to the optical axis by the beam splitter 18 onto the glass diffuser 14. The beam splitter is oriented at 45° to the optical axis to enable the glass diffuser 14 to be located with its perpendicular centerline at 90° to the optical axis. This ratio may be provided by selective silvering of the beam splitter and/or angular rotation of the beam splitter 16. The rotation and silvering would compensate for the large signal loss of the cable 16 to insure the remote readout 11 will have a highly visible optical signal. The glass diffuser is mounted on the side panel of an assembly which is normally attached to the water level gage 36 to thus provide the local visual indication of water level at the boiler drum.

As was mentioned, because of the losses in the cable 16, the brightness signal from the lamp 26 is desired to be transmitted to the end 24 of the cable 16. This is accomplished by aligning the end 24 of the cable 16 with the lamp 26 along the same axis. The end 24 of the cable 16 is mounted to a plate 42 which is secured to a stationary wall 44 by screws 46. The plate 42 is movable along the wall 44 to provide the mentioned alignment.

As may be best seen with reference to FIG. 2, a reflection 24' of the illuminated end 24 of the cable 16 is visible on the face 46 of the beam splitter 18 facing the cable 16. As the plate 42 holding the end 24 of the cable 16 is moved, the reflection 24' also moves on the face 46 of the beam splitter 18 and is seen to vary in intensity. By moving the plate 42, the position of the brightest illumination of the reflection 24' may be determined. The plate 42 is then secured to the wall 44 by the screws 48 thus securing the end 24 of the cable 16 in an optimum alignment position with respect to the lamp 26.

Certain modifications and improvements will occur to those skilled in the art upon reading this specification. It will be understood that all such improvements and modifications have been deleted herein for the sake of conciseness and readability but are properly covered within the scope of the following claims. As an example, the reflection 24' may also be viewed from the side of the beam splitter 18 facing the lamp 26 by virtue of the transmission of the reflection 24' through the beam splitter. Thus the alignment may be accomplished by viewing either face of the beam splitter 18.

I claim:

1. A method of aligning the locally receiving face of a fiber optic cable of a remote readout assembly with an optical signal from a locally measuring optical liquid level indicator comprising the steps of:
   providing a beam splitter between the locally receiving face of the fiber optic cable and the signal from the liquid level indicator;
   illuminating the locally receiving face of the fiber optic cable so as to have the optical signal from the indicator pass the beam splitter in illuminating the locally receiving face of the fiber optic cable;
   viewing the beam splitter so as to see the presence of the actual reflection of the locally receiving face of the fiber optic cable on the face of the beam splitter; and
   moving the locally receiving face of the fiber optic cable while viewing the face of the beam splitter to determine the position where the reflection of the face of the fiber optic cable on the face of the beam splitter is the brightest to thereby determine the maximum brightness of the remote readout assembly.

2. A method as set forth in claim 1 wherein the fiber optic cable has a face facing the beam splitter constrained to be selectively moved in a plane a predetermined distance from the beam splitter with said distance allowing the illumination of the entire face of the fiber optic cable.

3. A method as set forth in claim 1 including the step of securing the end of the fiber optic cable to a position on the plane providing the brightest reflection of the face of the fiber optic cable on the face of the beam splitter.

4. A method as set forth in claim 3 wherein the reflection of the face of the fiber optic cable is viewed on the face of the beam splitter facing the fiber optic cable.

* * * * *